— 3,458,559
Patented July 29, 1969

3,458,559
AMALGAM REDUCTION PROCESS FOR THE PRODUCTION OF ADIPONITRILE
Frank Stanley Holland, John Henry Edgar Marsden, and Denis Pemberton, Blackley, Manchester, England, assignors to Imperial Chemical Industries Limited, London, England, a corporation of Great Britain
No Drawing. Filed Dec. 2, 1965, Ser. No. 511,252
Claims priority, application Great Britain, Dec. 7, 1964, 49,713/64
Int. Cl. C07c *121/26*
U.S. Cl. 260—465.8    9 Claims

ABSTRACT OF THE DISCLOSURE

In the reduction of an organic compound with alkali metal or alkaline earth metal amalgam in aqueous medium, especially of acrylonitrile to adiponitrile, the residual aqueous liquid, after removing the reduced organic compound, is electrolyzed using a mercury cathode so as to reduce the concentration of alkali or alkaline earth metal ions, and form alkali or alkaline earth metal amalgam with the mercury, and the so treated aqueous liquor is used as the aqueous medium in the further reduction of the organic compound. Optionally the spent amalgam is used as the cathode in the electrolysis step, and the reformed amalgam from the electrolysis step is used in the further reduction.

---

This invention relates to the reduction of organic compounds with an amalgam of an alkali metal or alkaline earth metal, and especially to the reductive dimerisation of compounds which are acceptors in Michael reactions. By the term "acceptors in Michael reactions" we mean compounds containing a group of general formula

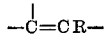

in which the R group activates the double bond. Examples of such compounds are listed in "Organic Name Reactions" by Krauch and Kunz 1964, John Wiley & Sons, page 315 and in "Name Reactions in Organic Chemistry" by Surrey 1961, Academic Press, on pages 173 and 174. Such compounds are referred to hereinafter as "Michael acceptors" and examples of Michael acceptors are $\alpha,\beta$ olefinic esters, amides and nitriles.

In the reduction of organic compounds in aqueous media with amalgams of alkali metals or alkaline earth metals, relatively large amounts of inorganic compounds are formed in the reaction medium as the amalgam reacts. The disposal of these inorganic compounds is not always convenient but we have now found that the disposal problem can be reduced by subjecting the spent reaction medium to electrolysis using a mercury cathode thereby reducing the concentration of inorganic compounds in the medium and making it suitable for use in further reductions. In this way any expensive additives which the reaction medium contains are conserved and furthermore alkali metal cations or alkaline earth metal cations are recovered from the reaction medium and may be used again as their amalgams with mercury.

Accordingly the present invention provides a process for the reduction of organic compounds which comprises:

(a) reacting the organic compound in an aqueous medium with an alkali or alkaline earth metal amalgam,
(b) separating some or all of the organic products of the reduction from the aqueous medium,
(c) electrolysing the aqueous medium with a mercury cathode so as to reduce the concentration of alkali or alkaline earth metal ions in the aqueous medium and to reform alkali or alkaline earth metal amalgam, and
(d) re-using the aqueous medium after electrolysis in a further reduction process as in step (a) above.

The mercury cathode after the electrolysis of step (c) above when it is enriched in alkali or alkaline earth metal may conveniently be used as the amalgam in step (d). Furthermore the denuded amalgam from the reduction process (step (a) above) may conveniently be used as the cathode for step (c). Clearly the process of the present invention can be adapted for continuous cyclic operation in which the denuded amalgam from step (a) is used as the cathode in step (c) and subsequently used as the amalgam in step (d) and the aqueous reaction medium from step (a) may be used as the electrolyte in step (c) and as the reaction medium in step (d). One or more cells and reaction vessels may be used in such a process. The process may be performed for example in an apparatus consisting of a reduction compartment containing the aqueous reaction medium and separated from an electrolytic cell containing an aqueous solution of alkali or alkaline earth metal ions by a layer of mercury which acts both as the cathode for the electrolytic cell and as an alkali or alkaline earth metal amalgam in the reduction compartment. Such apparatus is described in co-pending U.S. patent application No. 350,047.

Employing such apparatus the aqueous reaction medium may be placed together with the organic material to be reduced in the reduction compartment on one side of the mercury and an aqueous solution of an alkali metal or alkaline earth metal compound is placed in the electrolytic cell on the other side of the mercury. When the current is passed through the cell, amalgam is formed and there is an effective transfer of cations from the cell to the reduction compartment through the mercury cathode. The reaction medium is withdrawn from the reduction compartment and after separation of organic materials is returned to the electrolytic cell to provide a source of amalgam forming metal. When the aqueous medium in the cell becomes depleted of alkali metal or alkaline earth metal ions it may be returned to the reduction compartment and re-used as the reaction medium for the reduction of a further proportion of organic material.

If desired the process described above may be operated continuously by continuous withdrawal of reaction medium from the reaction compartment, separation of product and unreacted starting material, return of the aqueous residue to the electrolytic cell, and recycle of the aqueous medium from the electrolytic cell to the reduction compartment.

The process of the invention is suitable for continuous operation in other arrangements of electrolytic cells and is not limited to the use of a single cell as described above.

Alternatively a cell with a flowing mercury cathode may be used for the electrolysis.

In the reductive dimerisation of Michael acceptors the pH is preferably controlled between 2 and 13 with a more restricted preferred range between 5 and 11. The pH may be controlled in a variety of ways e.g. using a buffer solution. Suitable buffer solutions are salts of poly-basic acids such as phosphates, borates and carbonates. Alternatively the pH may be controlled by the addition of acid.

The acid may be added during the reaction or mixed with the reaction medium before reacting if adequate pH control is thus obtained.

The process of the present invention is especially useful in the reductive dimerisation of Michael acceptors as hereinbefore defined. Examples of Michael acceptors are $\alpha,\beta$-olefinic esters, amides and nitriles especially those of acrylic acid or substituted derivatives thereof. The process of the present invention is especially applicable to the hydrodimerisation of acrylonitrile and substituted derivatives thereof to form adiponitrile or substituted derivatives thereof.

The efficiency of the process may be improved by the use of certain additives, which in the hydrodimerisation of acrylonitrile for example, increase the yield of adiponitrile and reduce the amounts of undesirable by-product such as propionitrile or polymer which are formed. These additives may be salts capable of providing organic cations and especially alkylated cations in the aqueous medium. Such salts are described in detail in Ser. No. 511,210. They include alkyl ammonium, phosphonium and sulphonium salts especially tetraalkyl ammonium satls; for example tetraethyl ammonium chloride. The additives should be chosen so that they remain in the aqueous medium after separation of the main organic products. They are thus present in solution during electrolysis and are available for re-use without further separation. They should of course be stable under the conditions of electrolysis.

Other additives may be present for instance, alcohol or solubilising agents provided that they do not interfere with the process either in the main reaction vessel or in the mercury cell and also a small concentration of a polymerisation inhibitor such as N-N-dimethyl-p-nitrosoaniline. Potassium and sodium amalgams are found to be particularly suitable for use in the process of the invention.

The separation of organics is conveniently performed by conventional means such as distillation or solvent extraction. Examples of the invention will now be described.

Example 1

A mixture of potassium dihydrogen phosphate (81 g.) potassium hydroxide (18 g.) tetraethylammonium-p-toluene sulphonate (45 g.), water (150 g.), and acrylonitrile (59.9 g.) is placed in the inner (reduction) compartment of an apparatus similar to that described in Example 1 of the aforementioned Ser. No. 350,047 but of different dimensions and provided with a platinum anode and a 40% w./w. aqueous solution of potassium hydroxide is placed in the outer (anode) compartment which constitutes an electrolytic cell. A current of 4 amperes is passed through the cell for 120 minutes. The contents of the reduction compartment (excluding mercury) are withdrawn, the compartment is washed with water and the washings are added to the reaction mixture. The mixture, is distilled to remove acrylonitrile and some water, leaving a residue consisting of two liquid layers, A and B. The upper layer A consists mainly of an aqueous solution of tetraethylammonium-p-toluene sulphonate containing most of the adiponitrile formed in the reaction, while the lower layer B consists mainly of an aqueous solution of the potassium phosphates containing small amounts of the quarternary salt and of adiponitrile. The two layers are separated and layer A is diluted with water. Both layers ar ethen separately extracted with chloroform, the chloroform extracts are combined and dried, and the solvent is removed by distillation leaving the high boiling product from which adiponitrile is isolated by distillation under reduced pressure.

After extraction, layers A and B are separately distilled to remove residual solvent and layer B is passed to the anode compartment of a second electrolytic cell similar to the one used previously. The reduction compartment of this second apparatus contains a fresh charge of reactants as used for the first (reductive dimerisation) stage of the process. A current of 4 amperes is passed through this cell for 120 minutes and the contents of the reduction compartment worked-up and two layers $A_1$ and $B_1$ obtained as before layer $B_1$ being then returned to the anode compartment of the first apparatus from which the potassium hydroxide solution has been completely removed. The contents of the anode compartment of the second cell are removed and combined with layer A from the first reduction stage and the weight of this mixture is adjusted to that of the original reaction mixture (excluding the acrylonitrile) by removal of some of the water by distillation. Acrylonitrile (59.9 g.), is added to this concentrate and the mixture placed in the reduction compartment of the first apparatus where it is reacted as before with amalgam generated from the phosphate solution in the anode compartment. The product is isolated as before and the two phosphate streams used for further reductions.

The following results are obtained:

First reduction:
  Acrylonitrile initially present _____g___ 59.9
  Acrylonitrile recovered _____g___ 41.4
  Adiponitrile isolated _____g___ 15.3
  Yield of adiponitrile on acrylonitrile consumed _____percent___ 81
  Yield of adiponitrile on current passed percent___ 95

Second reduction (with amalgam regenerated from the phosphate solution obtained from the first reduction):
  Yield of adiponitrile on acrylonitrile consumed _____percent___ 90
  Yield of adiponitrile on current passed percent___ 92

Third reduction (using recovered phosphate solutions entirely):
  Yield of adiponitrile on acrylonitrile consumed _____percent___ 90
  Yield of adiponitrile on current passed percent___ 92

Example 2

A mixture of potassium dihydrogen phosphate (158 g.), potassium hydroxide (6 g.), water (60 g.), acrylonitrile (80.3 g.), and a 25% w./w. aqueous solution of tetramethylammonium hydroxide (240 g.), is placed in the inner reduction compartment of the apparatus used in Example 1, and a 40% w./w. aqueous solution of potassium hydroxide in the outer (anode) compartment. A current of 16 amperes is passed through the cell for 40 minutes. The contents of the reduction compartment (excluding mercury) are withdrawn, the compartment is washed with water and the washings are added to the reaction mixture. The mixture is distilled to remove acrylonitrile, propionitrile and some water. The distillate is found by analysis to contain acrylonitrile (47.7 g.) and propionitrile (1.6 g.). The distillation residue is extracted with chloroform, the extract is dried and solvent is removed by distillation leaving the high boiling product from which adiponitrile (14.4 g.) is isolated by distillation under reduced pressure. The residue from this reduced pressure distillation weighs 1.6 g. and is found to contain 0.4 g. adiponitrile by G.L.C. analysis.

The weight of the aqueous phase remaining after chloroform extraction is adjusted to that of the original reaction mixture (excluding the acrylonitrile) by removal of some of the water by distillation, and this phase is then placed in the outer anode compartment of a second apparatus similar to the first one. The inner reduction compartment of this second cell contains a fresh charge of reactants as used for the first (reductive dimerisation) stage of the process. A current of 16 amperes is passed through this cell for 40 minutes and the contents of the inner compartment worked-up as before, the aqueous phase remaining after chloroform extraction and removal of excess water being then returned to the outer anode compartment of the first apparatus from which the potassium hydroxide solution has been completely removed. The contents of the outer compartment of the second apparatus are removed and combined with acrylonitrile (79.5 g.). This mixture is placed in the reduction compartment of the first apparatus where it is reacted as before with amalgam generated from the phosphate solution in the anode compartment. The product isolated as before and the two phosphate streams used for further reductions.

The following results are obtained:

First reduction:
  Acrylonitrile initially present _____ g__ 80.3
  Acrylonitrile recovered _____ g__ 47.7
  Adiponitrile formed _____ g__ 14.8
  Yield of adiponitrile on acrylonitrile consumed
    percent__ 46
  Yield of adiponitrile on current passed
    percent__ 69

Second reduction (with amalgam regenerated from the phosphate solution obtained from the first reduction):
  Yield of adiponitrile on acrylonitrile consumed
    percent__ 46
  Yield of adiponitrile on current passed
    percent__ 67

Third reduction (using recovered phosphate solutions entirely):
  Yield of adiponitrile on acrylonitrile consumed
    percent__ 70
  Yield of adiponitrile on current passed
    percent__ 64

We claim:

1. In a process for the reductive dimerization of acrylonitrile to adiponitrile which comprises (a) reacting the acrylonitrile in a medium consisting essentially of water at a pH between 2 and 13 with an alkali or alkaline earth metal amalgam and (b) separating organic product from the aqueous residue, the improvement wherein (c) the aqueous residue is electrolyzed with a mercury cathode so as to reduce the concentration of alkali or alkaline earth metal ions and forms alkali or alkaline earth metal amalgam with the mercury, and (d) the so treated aqueous residue is reused in a further reductive dimerization of acrylonitrile with alkali or alkaline earth metal amalgam.

2. A process as claimed in claim 1 in which the mercury cathode after step (c) is used as the amalgan in step (d).

3. A process as claimed in claim 2 in which the spent amalgam from step (a) is used as a cathode in step (c).

4. A process are claimed in claim 3 in which the process is a continuous cyclic operation in which the spent amalgam after use in step (a) is used as the cathode in step (c) and subsequently used as the amalgam in step (d) and in which the aqueous medium after use in the reduction of step (a) is used as the electrolyte for step (c) and subsequently used as the reaction medium in step (d).

5. A process as claimed in claim 1 when performed in an apparatus consisting of a reduction compartment containing the aqueous reaction medium and separated from an electrolytic cell containing an aqueous solution of alkali or alkaline earth metal ions by a layer of mercury which acts both as the cathode for the electrolytic cell and as alkali or alkaline earth metal amalgam in the reduction compartment.

6. A process as claimed in claim 1 in which the pH is controlled between 5 and 11.

7. A process as claimed in claim 1 in which the pH is controlled by the use of a buffer solution which is a solution of a phosphate, borate or carbonate.

8. A process as claimed in claim 1 in which said medium includes organic cations selected from the group consisting of alkylated ammonium, phosphonium and sulphonium cations.

9. A process as claimed in claim 8 in which the organic cations are tetraethyl or tetramethyl ammonium.

References Cited

UNITED STATES PATENTS 2,439,308  4/1948  Leekley.
3,193,574  7/1965  Katchalsky et al.

JOSEPH P. BRUST, Primary Examiner

U.S. Cl. X.R.

204—73; 260—465.1, 485, 561